Aug. 12, 1969  E. C. CLUCHEY  3,460,264
WHEEL ALIGNMENT CHECKING DEVICE
Filed March 13, 1967  2 Sheets-Sheet 2
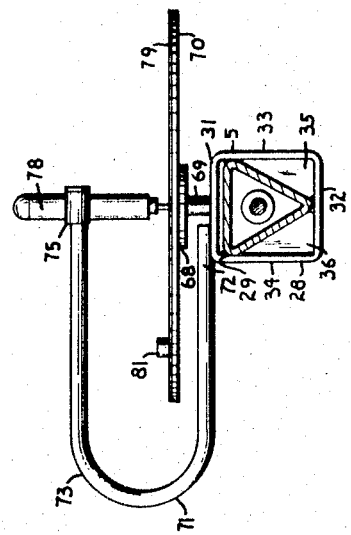
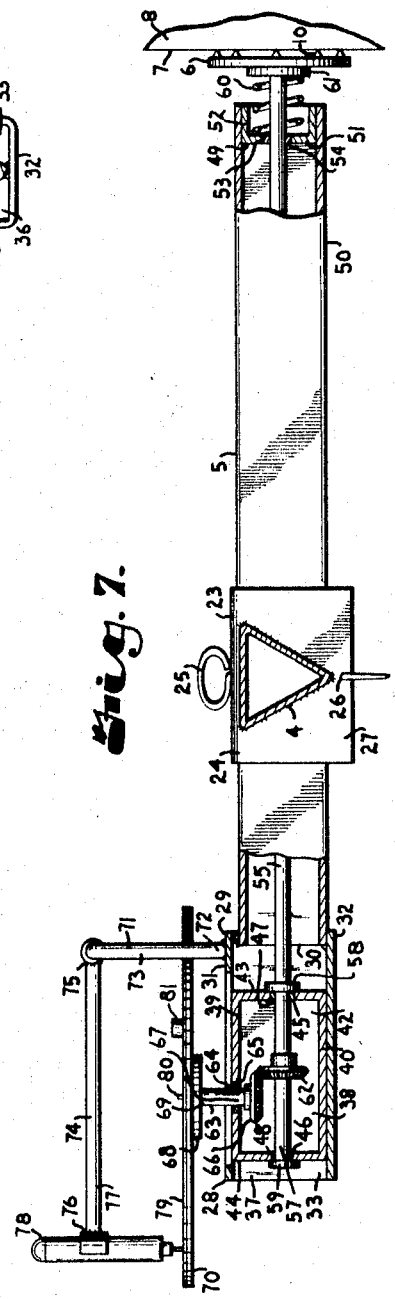
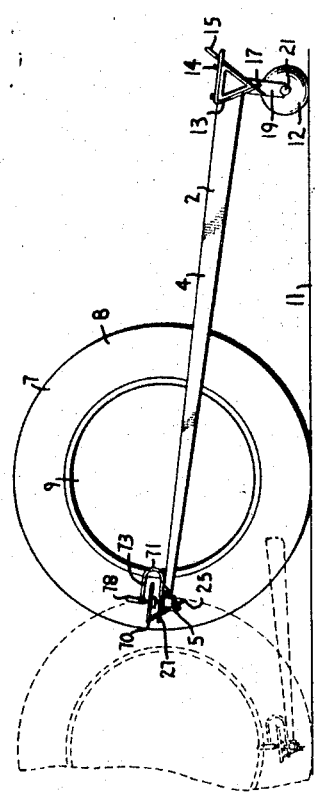
INVENTOR.
EDGAR C. CLUCHEY
BY
ATTORNEYS

# United States Patent Office 3,460,264
Patented Aug. 12, 1969

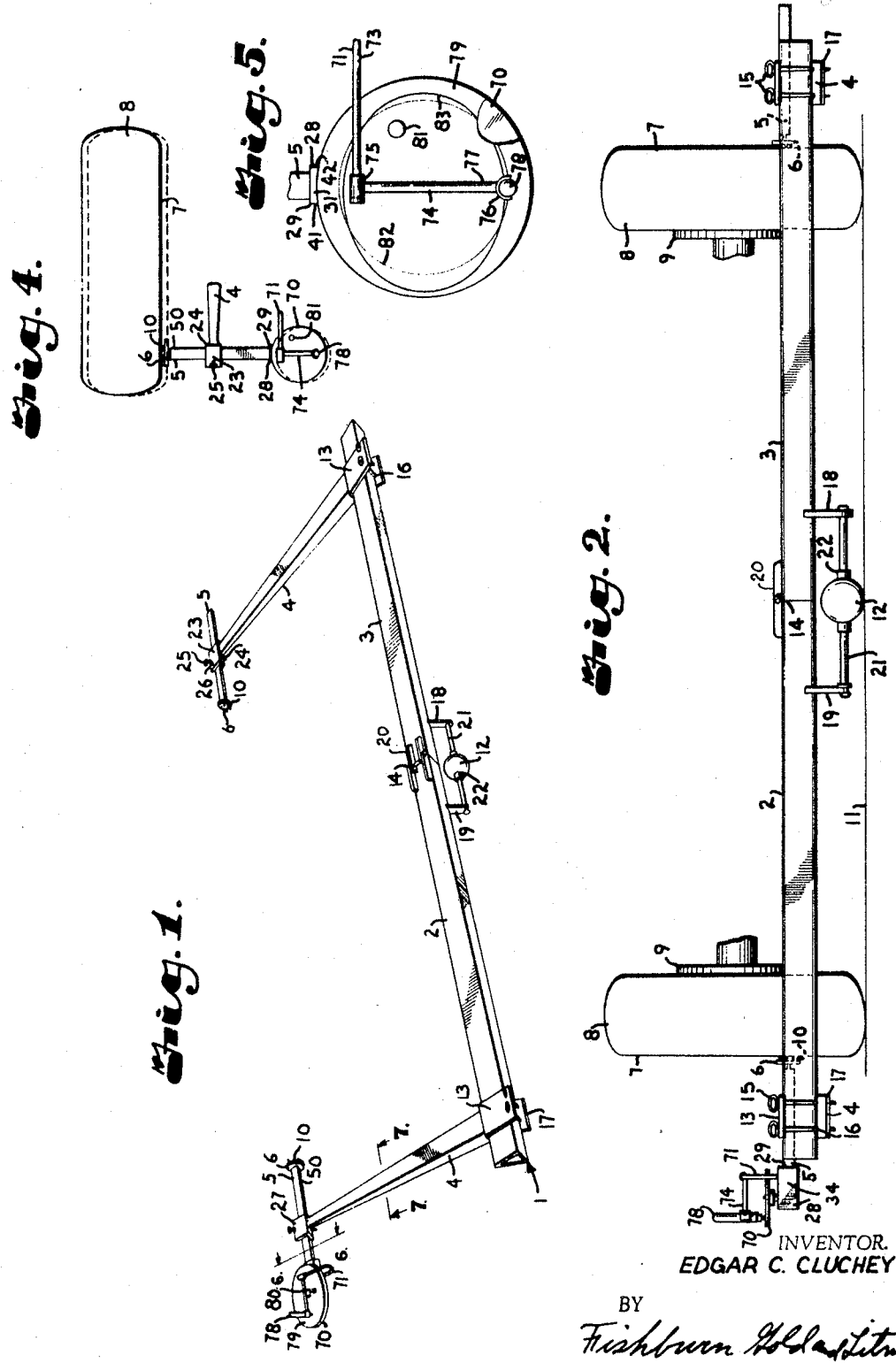

3,460,264
WHEEL ALIGNMENT CHECKING DEVICE
Edgar C. Cluchey, 832 Tauromee,
Kansas City, Kans. 66101
Filed Mar. 13, 1967, Ser. No. 622,606
Int. Cl. G01b 5/24
U.S. Cl. 33—203.17                                        9 Claims

ABSTRACT OF THE DISCLOSURE

A device for checking and recording the alignment of motor vehicle wheels with the normal weight of the vehicle on the wheels, said device making a permanent record of the alignment deviation in one complete revolution of the wheels. The device consists of a mobile frame having a base member and a pair of side arms. Guide members having tire engaging surfaces on one end are mounted on the free end of each of the side arms. A measuring and recording head is movably mounted relative to one of the side arms and responsive to lateral movement and rotation of the pair of wheels being checked to record the alignment of the wheels.

---

The principle objects of the present invention are to provide a device which tests, measures and records the alignment of motor vehicle wheels; to provide a device which records the alignment of motor vehicle wheels in response to one complete revolution of the wheels; to provide such a device which produces a permanent record of the alignment of motor vehicle wheels which can be compared with an indication of correct alignment; to provide such a device of simple, compact, and strong construction which accurately measures and records the alignment of the wheels; to provide such a device which is lightweight and portable; to provide such a device which is adjustable to the wheel spacing and size; and to provide such a device which is economical to manufacture, which can be easily installed and which is simple in operation.

Other objects and advantages of this invention will become apparent from the following description taken in connection with the accompanying drawings, which are set forth by way of illustration and example certain embodiments of this invention.

FIG. 1 is a perspective view of a wheel alignment checking device embodying the features of the present invention.

FIG. 2 is a front elevation of the device arranged relative to a pair of wheels to be checked.

FIG. 3 is a side elevation of the device engaging a wheel and indicating forward motion by showing a prior position in broken lines.

FIG. 4 is a partial plan view of the device showing movement of the recording head in response to lateral movement of the wheels being checked.

FIG. 5 is an enlarged partial plan view showing the recording head with a portion of the recording sheet broken away to show the recording platform.

FIG. 6 is a sectional view taken on line 6—6, FIG. 1, showing the recording head in elevation.

FIG. 7 is a sectional view taken on line 7—7, FIG. 1, showing the guide member and recording head in elevation with portions broken away to show the operating parts.

Referring more in detail to the drawings:

The reference numeral 1 generally designates a wheel alignment checking apparatus and recording device for checking and recording the alignment of motor vehicle wheels. The apparatus includes a U-shaped mobile frame 2 having an elongate base member or beam 3 and pair of side arms 4. The side arms 4 have one end mounted on the base member 3 and it is preferred that one or both arms be adjustable thereon to vary the spacing therebetween to accommodate different wheel spacing and width of wheels. In the illustrated structure a pair of guide members 5 are adjustably mounted on the opposite end of each side arm 4. Each guide member 5 has a tire engaging surface member 6 rotatably mounted on one end thereof. The guide members 5 are adapted to be mounted in axial alignment and adapted to engage the exterior side surface 7 of tires 9 which are mounted on the wheels 9 to be checked. It is preferred that each tire engaging surface member 6 have a plurality of spaced points of engagement with the tire 8 such as a plurality of pointed projections 10 to engage the tire surface 7.

The base or beam member 3 is arranged to move over a floor or surface 11 and in the illustrated structure it is supported by a roller 12 rotatably and movably mounted on and below the base member 3.

The base member or beam 3 is preferably of non-circular cross-section and the arms 4 have C-shaped ends 13 sleeved thereon whereby the non-circular cross section prevents rotation of the arms on the beams 3. In the illustrated structure the beams 3 and end 13 are of triangular cross section. However, it is to be understood that any suitable cross section such as rectangular or square may be substituted for the illustrated triangular cross section. In order to provide for ease of storage and ease of movement of the frame 2, the base member 3 is hinged intermediate its ends as at 14 to permit folding of said frame 2. The arms 4 are secured in selected position on the beam 3 by tapered pins 15 which are driven into aligned openings 16 on each finger 17 of the C-shaped arm ends 13, said pins frictionally engaging the beam 3 to secure the arms 4 in selected spaced relation. It is to be understood that the tapered pins 15 are only one securing means and that any other suitable fastening device such as bolts could be used to secure the respective arms 4 in their adjusted positions on the beam 3. The hinged beam portions may be secured in aligned relation; however, it is preferred to use the mounting of the roller 12 to aid in holding the beam sections aligned. The beam sections each have ears 18 and 19 equally spaced on each side of a hinge 20 and are mounted on the base member or beam 3 in depending relation thereto. A rod or shaft 21 has one end mounted on one of the standards or ears 18 in spaced relation below the base member 3. The other end of the rod 21 is adapted to be engaged by the other standard 19 and retain the standard 19 in position. Sleeves 22 are mounted on the roller 12 to increase the bearing area on the rod 21. The roller 12 is mounted to support the base member or beam 3 for movement in response to longitudinal movement of the motor vehicle (not shown) said frame 2 moving in a straight line corresponding to the line of movement of the vehicle. In the illustrated structure, the roller 12 is illustrated as a sphere. However, it is to be understood that any suitable roller may be substituted therefor.

Each guide member 5 is adjustably mounted at the end 23 of the side arms 4. In the structure illustrated the ends 23 of the side arms 4 have generally C-shaped portions 24 in which the guide members 5 are sleeved and secured in selected relative position. The guide members 5 are non-circular in cross section such as triangular and each is secured in the respective end portion 24 by a tapered pin 25 which is driven into aligned openings 26 in each of the margins or sides 27 of the C-shaped arm ends 24 providing a frictional engagement with the respective guide members 5.

An elongate housing 28 has an end 29 mounted on one of the guide members 5 at end 30 thereof. The housing 28 is rectangular in cross section and has top and bottom members 31 and 32 respectively and sides 33 and 34. The space between the triangular guide member 5 at end 30 and the rectangular housing 28 at end 29 is closed by triangular inserts 35 and 36 said triangular inserts 35 and 36 being suitably secured to end 29 of housing 28 and to end 30 of the one guide member 5 as by welding. End 37 of housing 28 is open.

An elongate gear box 38 is movably mounted within the housing 28. The gear box 38 is of closed rectangular construction having top and bottom members 39 and 40 respectively, side walls 41 and 42, and end walls 43 and 44. Aligned openings 45 and 46 are in the wall ends 43 and 44 respectively and bearings 47 and 48 are mounted in the openings 45 and 46 respectively.

A member 49 is fixedly mounted at end 50 of the one guide member 5. The member 49 is triangular shaped and is complementary to the interior of said guide member 5 end. In the illustrated structure the member 49 has an end plate 51 and outstanding flanges 52 suitably secured to the guide member as by welding. A bearing 53 is placed in opening 54 in the end plate 41 in alignment with the bearings 47 and 48 in the gear box 38.

An elongate shaft 55 is rotatably mounted in bearings 47, 48 and 53 and has ends 56 and 57. Keepers 58 and 59 are mounted on the elongate shaft 55 in spaced relation adjacent the end 56 and engaging ends 43 and 44 respectively on the outside of the gear box 38 thereby retaining the gear box 38 against relative endwise movement on the shaft. A tire engaging member 6 is fixedly mounted on end 57 of the elongate shaft 55. The bearings 47, 48 and 53 support the elongate shaft 55 and permit longitudinal movement thereof. A helical spring 60 is mounted around the elongate shaft 55 and engages end plate 51 of member 49 and a bearing member 61 mounted on the tire engaging member 6.

A first bevel gear 62 is fixedly mounted on the elongate shaft 55 within the gear box 38. A stub shaft 63 is rotatably supported in a bearing 64 which is mounted in an opening 65 in the top member 39 of the gear box 38. A second bevel gear 66 is mounted on end 67 of the stub shaft 63 in the gear box 38 and meshes with the first bevel gear 62. The stub shaft extends from the gear box through a slot 67 in the housing top member 39, said slot being parallel with the longitudinal axis of the elongate shaft whereby the stub shaft may move in response to longitudinal movement of said shaft 55. An annular bearing plate 68 is mounted on an end 69 of the stub shaft 63 and the bearing plate 67 supports a circular platform 70.

An arm 71 has an end 72 suitably fixed to the top member 30 of the housing 28 as by welding. The arm 71 is illustrated as including a U-shaped portion 73 mounted perpendicular to the housing 28. An arm portion 74 is mounted on the U-shaped portion 73 at a point 75 and pivots whereby it may be lifted. The arm portion 74 is transverse to the U-shaped portion 73, parallel with the longitudinal axis of the elongate shaft 55, and perpendicular to the longitudinal axis of the stub shaft 63 as shown in FIGS. 5 and 6. A clip 76 is mounted on end 77 of the arm portion 74 and is adapted to detachably receive and retain a recording instrument 78.

A sheet 79 is placed on the platform 69 on a spindle 80. The spindle 80 is an extension of the stub shaft 63 and is of a smaller diameter. The sheet 79 is retained in place by a disc magnet 81. The sheet 79 may be any suitable material adapted to be marked by the recording instrument 78 such as stiff paper and thin cardboard.

In the illustrated structure correct alignment of the wheels 9 would be recorded on the sheet 79 as a true circle 82. A figure 83 is shown in FIG. 5 to illustrate one possible record made on sheet 79 when the wheels 9 are not in correct alignment. This record is a visable element that the vehicle owner can see and appreciate the alignment situation without the skill and knowledge of front wheel geometrics.

When it is desired to check the alignment of a pair of wheels 9, the alignment checking apparatus and recording device 1 is centered on the vehicle (not shown) which vehicle may be on any surface, as it is not necessary to place the vehicle on a level surface to obtain accuracy. The side arms 4 are adjusted longitudinally along the base member 3 to be approximately equally spaced from the longitudinal axis of the vehicle and secured to the base member 3 by driving the tapered pins 15 into the aligned openings 16 in the fingers 17 of the C-shaped arm ends 13. The guide members 5 are adjusted in each of the side members 4 so that the guide members 5 and tire engaging members 6 are in axial alignment and then secured in position. The motor vehicle (not shown) is then driven longitudinally forward or backward a distance sufficient for the wheels 9 to make one complete revolution. The engagement of the tire engaging members 6 with the tires is positive and such that as the vehicle is moved the checking apparatus is moved therewith without any moving force being applied by the operator. Relative lateral movement of the wheels 9 engaged by the tire engaging members 6 and rotation of the wheels 9 being checked is recorded on the sheet 79 by the recording instrument 78. Rotation of the tires 8 rotates the tire engaging members 6 thereby rotating the elongate shaft 55 and the first bevel gear 62. The first bevel gear 62 rotates the second bevel gear 66 thereby rotating the stub shaft 63 and the platform 70 mounted thereon. Relative lateral movement of the wheels 9 moves the elongate shaft 55 transversely of the side arm 4, wheel movement is transmitted to the gear box 38 moving the stub shaft 63 and the platform 70. The stub shaft 63 moves within the slotted opening 67 in the housing 28. The recording instrument 78 is in fixed spaced relation to the housing 28 and therefore any relative lateral movement of the wheels 9 will be recorded as a deviation from a true circle 82.

It is to be understood that while I have illustrated and described one form of my invention, it is not to be limited to the specific form or arrangement of parts herein described and shown.

What I claim and desire to secure by Letters Patent is:

1. A wheel alignment checking apparatus and recording device for checking and recording the alignment of motor vehicle wheels including:
  (a) an elongate mobile frame having a base member and a pair of side arms each with one end mounted on the base member,
  (b) a pair of members having tire engaging surfaces each mounted on the other end of a side arm, said tire engaging surface members being adapted to be arranged in axial alignment with each other and engaged with outer sides of the tires mounted on a pair of vehicle wheels to be checked, one of said tire engaging surface members having a plurality of pointed projections to engage the side of one of the tires being checked, said one of the tire engaging surface members being mounted for rotation on the axis of alignment of said tire engaging surface members and for movement relative to the side arm on which it is mounted,
  (c) a wheel alignment measuring and recording head movably mounted relative to the one side arm adjacent the movable tire engaging surface member and movably thereby,
  (d) a recording instrument associated with the recording head to make a permanent record of an alignment check in response to rotation and movement relative to the respective side arm of the one tire engaging surface member as the wheels being checked are rotated through a full term.

2. A wheel alignment checking apparatus and recording device for checking and recording the alignment of motor vehicle wheels as set forth in claim 1 wherein the frame is comprised of non-circular members and the side arms are adjustable longitudinally along the base member and secured in the adjusted positions, said base member being section with said section hingedly connected for folding of the base member.

3. A wheel alignment checking apparatus and recording device for checking and recording the alignment of motor vehicle wheels as set forth in claim 1 and including, guide members extending substantially axially of the tire engaging members, said guide members being adjustably mounted in the other end of each of the side arms for axial movement, said tire engaging members being mounted in said guide members.

4. A wheel alignment checking apparatus and recording device for checking and recording the alignment of motor vehicle wheels including:
   (a) an elongate mobile frame having a base member and a pair of side arms each with one end mounted on the base member,
   (b) a pair of members having tire engaging surfaces each mounted on the other end of a side arm, said tire engaging surface members being adapted to be arranged in axial alignment with each other and engaged with outer sides of the tires mounted on a pair of vehicle wheels to be checked, one of said tire engaging surface members being movably mounted relative to the side arm on which it is mounted,
   (c) each of said tire engaging surface members having a plurality of pointed projections to engage the side of a tire on one of the wheels to be checked, said tire engaging surface members each being rotated as the respective tire is rotated,
   (d) a wheel alignment measuring and recording head having a housing mounted in fixed relation to one of the side arms adjacent a movable tire engaging surface member,
   (e) a shaft operatively connected to said tire engaging surface member adjacent the housing and movably mounted relative to said one side arm and housing,
   (f) a recording member movable in said housing and operatively connected to the shaft,
   (g) a recording instrument associated with the recording head,
   (h) an arm having one end fixedly mounted on the housing and the other end adapted to detachably mount said recording instrument therein,
   (i) a resilient means having one end retained in position relative to the one side arm and engaging the tire engaging surface member and urging the surface members into firm contact with the tire, whereby the shaft is movable transversely of the one side arm in response to relative lateral movement of the wheel portions engaged by said tire engaging surface members thereby moving the recording member relative to the fixed housing and arm having the recording instrument therein, to make a permanent record of the alignment check in response to movement of the tire engaging surface member as the wheels being checked are rotated.

5. A wheel alignment checking apparatus and recording device for checking and recording the alignment of motor vehicle wheels including:
   (a) an elongate mobile frame having a base member and a pair of side arms each with one end mounted on the base member,
   (b) a pair of members having tire engaging surfaces each mounted on the other end of a side arm, said tire engaging surfaces members being adapted to be arranged in axial alignment with each other and engaged with outer sides of the tires mounted on a pair of vehicle wheels to be checked, one of said tire engaging surface members being movably mounted relative to the side arm on which it is mounted,
   (c) each of said tire engaging surface members having a plurality of pointed projections to engage the side of a tire on one of the wheels to be checked, said tire engaging surface members each being rotated as the respective tire is rotated,
   (d) guide members extending substantially axially of the tire engaging members, said guide members being adjustably mounted in the other end of each of the side arms for axial movement, a tire engaging member being mounted in one of said guide members,
   (e) an elongated shaft rotatably and movably mounted in the other of the guide members, said elongated shaft having the other tire engaging surface member fixedly mounted on one end thereof at one end of the guide member,
   (f) a wheel alignment measuring and recording head having a housing mounted in fixed relation to one of the side arms adjacent a movable tire engaging surface member,
   (g) a recording member movable in said housing and operatively connected to the shaft for movement in response to axial movement of said elongated shaft,
   (h) means connected to said elongated shaft and operative in response to rotation thereof to rotate the recording member,
   (h) an arm having one end fixedly mounted on the housing and the other end adapted to detachably mount said recording instrument therein,
   (i) a resilient means having one end retained in position relative to the one side arm and engaging the tire engaging surface member and urging the surface members into firm contact with the tire, whereby the shaft is movable transversely of the one side arm in response to relative lateral movement of the wheel portions engaged by said tire engaging surface members thereby moving the recording member relative to the fixed housing and arm having the recording instrument therein, to make a permanent record of the alignment check in response to movement of the tire engaging surface member as the wheels being checked are rotated.

6. A recording head as set forth in claim 5 wherein the structure includes:
   (a) a gear box retained on the other end of said elongated shaft, said gear box being movably mounted within said housing,
   (b) bearings in the gear box rotatably supporting the elongated shaft,
   (c) the means connected to said elongated shaft and operative to rotate the recording member including a first bevel gear mounted on the elongated shaft within the gear box,
   (d) a stub shaft,
   (e) a bearing in the gear box rotatably supporting the stub shaft,
   (f) a second bevel gear meshing with the first bevel gear, said second bevel gear being mounted on one end of the stub shaft,
   (g) said recording member being a platform and fixedly mounted on the other end of the stub shaft, whereby rotation of the wheels rotates the tire engaging surface member thereby rotating the elongated shaft which, through the first and second bevel gears, rotates the stub shaft and platform, the recording instrument making a permanent record of the lateral movement and rotation of the wheels.

7. A wheel alignment checking apparatus and recording device for checking and recording the alignment of motor vehicle wheels including:
   (a) an elongate mobile frame having a base member that is sectional with said sections hingedly connected for folding of the base member,
   (b) said mobile frame including a pair of side arms each with one end mounted on the base member and adjustable longitudinally thereof and secured in adjusted position, said base member and side arms being non-circular members.

(c) a pair of standards depending from the base member and equally spaced from the hinge therein, (d) a rod mounted on the standards in vertical spaced relation to the base member, (e) a sleeve movably and rotatably mounted on the rod, (f) a roller mounted on the sleeve, whereby the roller supports the base member for movement in response to longitudinal movement of the motor vehicle and the frame moves laterally in response to relative lateral movement of the wheel portions engaged by said tire engaging surface members by the rod moving laterally within the sleeve, (g) a pair of members having tire engaging surfaces each mounted on the other end of a side arm, said tire engaging surface members being adapted to be arranged in axial alignment with each other and engaged with outer sides of the tires mounted on a pair of vehicle wheels to be checked, one of said tire engaging surface members being movably mounted relative to the side arm on which it is mounted, (h) a wheel alignment measuring and recording head movably mounted relative to the one side arm adjacent the movable tire engaging surface member and movable thereby, (i) a recording instrument associated with the recording head to make a permanent record of an alignment check in response to movement of the one tire engaging surface member as the wheels being checked are rotated.

8. A wheel alignment checking apparatus and recording device for checking and recording the alignment of motor vehicle wheels including:

(a) an elongate U-shaped mobile frame having a base member and a pair of side arms, each with one end adjustably mounted on the base member, said frame being comprised of non-circular tubular members and the base member being sectional with said sections hingedly connected for folding of the base member, (b) means for securing the side arms to the base member, (c) a pair of guide members, each adjustably mounted on the other end of a side arm, said guide members being adapted to be mounted in axial alignment on the exterior sides of tires mounted on the wheels to be checked, (d) means for securing a guide member to each side arm, (e) a tire engaging member rotatably mounted in each guide member, said tire engaging member having a plurality of spaced pointed projections to engage said tire, (f) a roller rotatably and movably mounted on and supporting the base member of the mobile frame, (g) a housing fixedly mounted on one of the guide members on an end opposite to the tire engaging member, (h) a recording member operatively connected to one of the tire engaging members and responsive to lateral movement of the wheels being checked, (i) an arm with one end fixedly mounted on the housing, (j) a sheet detachably mounted on the recording member, and (k) a recording instrument detachably mounted in the other end of the arm, whereby lateral movement and rotation of the wheels being checked is permanently recorded on the sheet mounted on the recording member.

9. An apparatus as set forth in claim 8 wherein the recording member includes:

(a) a gear box movably mounted within said housing, (b) a plurality of bearings mounted in the gear box, (c) an elongated shaft movably and rotatably mounted within one of said guide members, said elongated shaft having said tire engaging member fixedly mounted on one end and the gear box retained on the other end with the shaft rotatably supported by the bearings in the gear box, (d) a first bevel gear mounted on the elongated shaft and within the gear box, (e) a stub shaft rotatably supported by one of the bearings in the gear box, (f) a second bevel gear meshing with the first bevel gear, said second bevel gear being mounted on one end of the stub shaft, (g) said recording member being a platform and fixedly mounted on the other end of the stub shaft, (h) a slotted opening in the housing, said opening being parallel with the longitudinal axis of the elongated shaft, and (i) a resilient means engaging the one guide member and the tire engaging member, said resilient member urging the tire engaging member into firm contact with one of the tires, whereby rotation of the wheels rotates the tire engaging member thereby rotating the elongated shaft which, through the first and second bevel gears rotates the stub shaft and platform and lateral movement of the wheels moves the tire engaging member and elongated shaft thereby moving the gear box and the stub shaft mounted therein which moves the platform all relative to the recording instrument.

References Cited

UNITED STATES PATENTS

| 1,589,048 | 6/1926 | Bussard | 33—203.2 |
| 1,591,989 | 7/1926 | Moakley et al. | 346—131 |
| 1,648,275 | 11/1927 | Karling et al. | 346—131 X |
| 1,894,370 | 1/1933 | Erickson | 33—203.2 |
| 2,159,084 | 5/1939 | Harrison | 33—203.17 |
| 2,623,297 | 12/1952 | Arthur | 33—203.17 |
| 3,116,562 | 1/1964 | Hunter | 33—203.17 |

WILLIAM D. MARTIN, JR., Primary Examiner

U.S. Cl. X.R.

346—131